Figure 1:
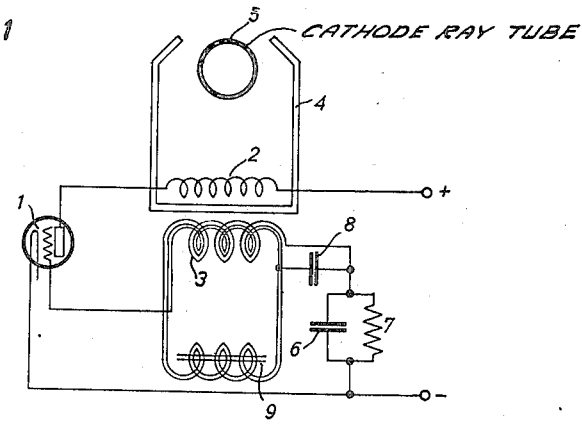

June 1, 1943.    H. BÄHRING    2,320,551
RELAXATION OSCILLATOR
Filed March 20, 1941    2 Sheets-Sheet 1

INVENTOR
HERBERT BÄHRING
BY
ATTORNEY

June 1, 1943.  H. BÄHRING  2,320,551
RELAXATION OSCILLATOR
Filed March 20, 1941  2 Sheets-Sheet 2

INVENTOR
HERBERT BÄHRING
BY
ATTORNEY

Patented June 1, 1943

2,320,551

UNITED STATES PATENT OFFICE 2,320,551

RELAXATION OSCILLATOR

Herbert Bähring, Klein-Machnow, Germany; vested in the Alien Property Custodian

Application March 20, 1941, Serial No. 384,336
In Germany March 13, 1940

6 Claims. (Cl. 250—27)

The invention relates to circuit arrangements including a transformer with ferromagnetic core. It refers particularly to relaxation oscillation generators producing deflecting currents in which an anode coil and/or a grid coil is arranged upon the iron core of the transformer.

The iron core is magnetized by the D. C. component and the A. C. components of the anode current and/or grid current of the discharge tube. While the A. C. component produces the useful deflecting current, the D. C. component has the undesirable effect of reducing the permeability. Particularly in case the circuit is used for producing saw tooth currents, as, for example, in television apparatus, by means of an inductive reaction between the grid circuit and the anode circuit of the discharge tube, the core is magnetized by the D. C. component. In order to compensate this magnetization it has been suggested to arrange additional coils upon the core and to energize these coils by a separate source of D. C. current. Such a compensation of the magnetic flux has however the drawback that it requires a separate source of potential and a certain additional amount of energy.

It is an object of the present invention to reduce the undesirable D. C. component of the magnetic flux within the iron core of a transformer arranged in a relaxation oscillation circuit. A further object is to operate the relaxation oscillation circuit with a minimum of energy and to use a transformer including an iron core of small dimensions. A further object is to provide a relaxation oscillation circuit producing a saw tooth deflecting current having exactly linear ascending and descending portions so that this current can be utilized for deflecting the cathode ray in television or oscillograph tubes.

According to the invention a magnetic flux of opposite direction as that produced by the D. C. component of the anode and/or grid current is produced by a coil through which a current flowing in another portion of the arrangement is guided. Preferably the D. C. current flowing in the secondary circuit of the transformer is guided repeatedly over a high A. C. resistance and through the additional windings so that the resulting magnetic flux has the desired value.

According to the invention this principle is used particularly in saw tooth current generators in which a diode is arranged in parallel to the deflecting coils. In this case the current flowing through the diodes is guided through the additional compensating windings.

Other aspects of my invention will be apparent or will be specifically pointed out in the description forming a part of this specification, but I do not limit myself to the embodiment of the invention herein described, as various forms may be adopted within the scope of the claims.

Referring to the drawings:

Fig. 1 shows a deflecting circuit including a ferro-magnetic yoke, Figs. 2, 3, 4 and 5 show each deflecting circuits including transformers and different forms of compensating coils.

The circuit of Fig. 1 represents a saw tooth current generator including a transformer. The anode circuit and the grid circuit of a discharge tube 1 are inductively coupled by way of the transformer. The anode coil 2 and the grid coil 3 are arranged upon an iron yoke 4. This yoke has two arms embracing the neck of a cathode ray tube 5 so that a magnetic deflecting field is produced in this part of the tube. The grid circuit is connected to an arrangement consisting of a condenser 6 and a resistance 7 lying in parallel for producing the biasing potential for tube 1. According to the invention the grid is not directly connected for D. C. currents with the arrangement 6, 7 by way of the secondary winding of the transformer but the D. C. current flowing through the grid circuit is repeatedly guided through windings arranged upon the iron core so that the D. C. component flowing in this circuit compensates the magnetic flux produced by the D. C. component of the anode circuit. The grid is connected directly with the arrangement 6, 7 for A. C. currents by the condenser 8. This condenser may be replaced by the natural capacity of the arrangement. Choke windings 9 are arranged between the secondary winding of the transformer so that only the D. C. component can pass through this circuit. By suitably dimensioning of the windings of this grid circuit is is possible either to completely compensate the D. C. component of the magnetic flux produced by the anode coil or to produce such a value of this flux that the permeability becomes a maximal value.

Figure 2:
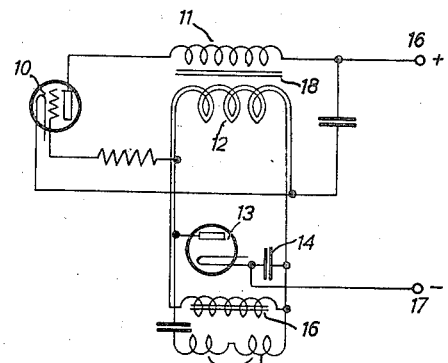

Fig. 2 shows another embodiment of a deflecting circuit according to the invention in which a diode is arranged for making the saw tooth current more linear. The triode 10 is connected to an anode coil 11 and a grid coil 12. The arrangement contains a diode 13 arranged in parallel to the grid coil together with a condenser 14, and two deflecting coils 15 arranged in parallel to the diode. The choke 16 is arranged between one end of the grid coil and the additional winding. The additional winding is connected with its other end to the cathode of tube 10. The positive pole of the source of potential is connected to the anode coil at 16 and the negative pole to the cathode of the diode at 17. The grid circuit and the anode circuit of tube 10 are inductively coupled by way of the transformer 18. The anode current contains a D. C. component producing a magnetic flux in the core of the transformer 18. This flux is compensated by the additional winding of the secondary coil. This secondary coil produces a constant magnetic field by means of the D. C. component of the grid current and of the D. C. current flowing through the diode 13. The choke 16 arranged between the additional windings of the secondary coil has a high A. C. resistance so that only the D. C. component can pass through the additional windings. A resistance may be arranged in parallel to the condenser 14. The cathode of tube 10 is connected by way of the additional windings and the choke 16 to one side of the condenser 14 so that the anode potential of tube 10 is produced by the potential of the source of potential connected to the points 16 and 17 and by the potential of the condenser 14.

Figure 3:
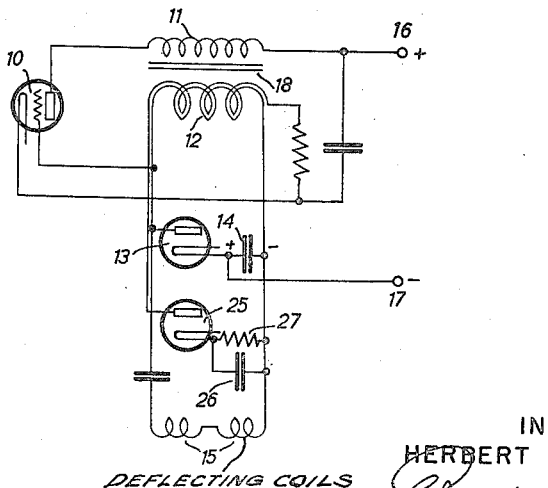

Fig. 3 shows an arrangement similar to that of Fig. 2. All equivalent parts of this arrangement are designated with the same reference numerals as in Fig. 2. The choke 16 of Fig. 2, however, is replaced in Fig. 3 by a biased diode 25 so that this diode operates as high A. C. resistance. The cathode of the diode is connected to an arrangement containing in parallel a condenser 26 and a resistance 27. The polarity of the diode is so chosen that it does not short-circuit the high voltage peaks occurring at the grid coil.

In many cases particularly in television transmitting or receiving circuits, it is desirable to make the amount of D. C. current flowing through the deflecting coils adjustable so that the television image may be shifted in its entirety upon the screen of the cathode ray tube.

Figure 4:
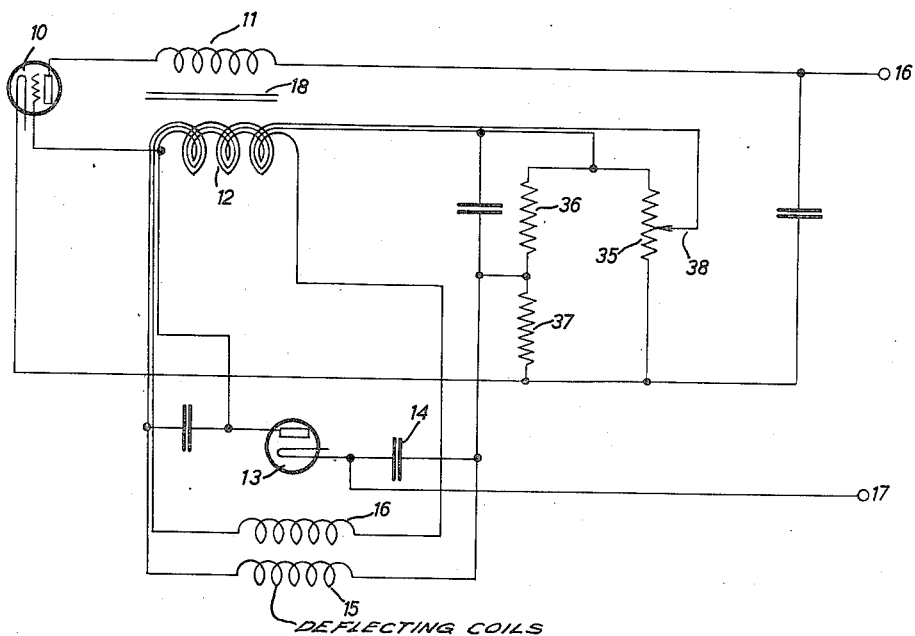

Fig. 4 shows an arrangement similar to that of Fig. 2 containing, however, a bridge circuit consisting of resistances 35, 36, 37 for adjusting the D. C. component and for changing the direction of the D. C. component of the grid current. The D. C. component is controlled by the adjustment of the sliding contact 38 so that the deflecting coils 15 receive more or less D. C. current. It is also possible to change the direction of the resulting D. C. component. The change of the D. C. component effects a shifting of the image upon the screen of the cathode ray tube.

Figure 5:
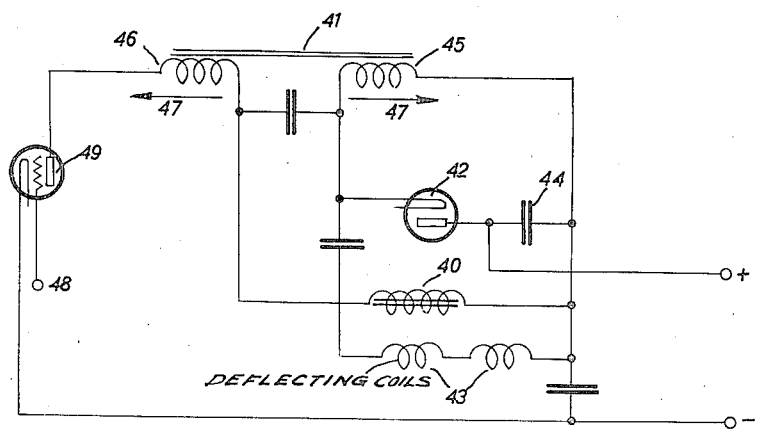

A further embodiment is represented in Fig. 5. This figure shows an arrangement in which no reaction takes place between the anode circuit and the grid circuit of the discharge tube 49. The anode circuit of this tube contains a transformer 41 having two coils 45 and 46 of opposite direction of winding. The deflecting coils 43 are connected to coil 45 and a diode 42 is connected in parallel to the deflecting coils together with a condenser 44. A choke coil 40 is connected between the transformer winding 46 and the deflecting coils. The choke is arranged in such a manner that the D. C. component of the anode current flows through the two windings 45 and 46 of the transformer in opposite direction, as indicated by the arrow 47. The D. C. component of the magnetic flux produced by these two windings is therefore compensated. The grid of the tube 49 is connected to an impulse generator at 48 and the whole deflecting arrangement is synchronized and actuated by impulses or saw tooth voltages applied to the grid of tube 49.

The invention is not limited to the embodiments shown in the drawings. It can be applied in all cases in which a magnetic D. C. component of the magnetic flux appears in primary or secondary windings of a transformer and in which this flux shall be partly or completely compensated. The expression "secondary winding" as used herein designates the coil of the transformer having the smaller direct current component.

What I claim is:

1. A saw-tooth wave generator including a transformer having a ferromagnetic core, a discharge tube having an anode, a cathode and a control grid, a primary coil on said core connected in the anode circuit of said tube, a secondary coil on said core connected in the grid circuit of said tube and having a first group of windings and a second group of windings, and an element having a high impedance value for the alternating grid current component connected in circuit with the second group of windings to permit passage therethrough only of the steady grid current component, thereby to produce a steady magnetic field adapted at least partially to compensate the steady magnetic field developed by said primary coil.

2. A saw-tooth wave generator including a transformer having a ferromagnetic core, a discharge tube having an anode, a cathode and a control grid, a primary coil on said core connected in the anode circuit of said tube, a secondary coil on said core connected in the grid circuit of said tube and having a first group of windings and a second group of windings comprising a plurality of sets of windings, a plurality of elements each having a high impedance value for the alternating grid current component, means for connecting alternately one of said sets of windings and one of said elements in series relation to permit passage through said second group of windings only of the steady grid current component, thereby to produce a steady magnetic field adapted at least partially to compensate the steady magnetic field developed by said primary coil.

3. A saw-tooth wave generator including a transformer having a ferromagnetic core, a discharge tube having an anode, a cathode and a control grid, a primary coil on said core connected in the anode circuit of said tube, a secondary coil on said core connected in the grid circuit of said tube and having a first group of windings and a second group of windings, and a choke coil having a high impedance value for the alternating grid current component connected in circuit with the second group of windings to permit passage therethrough only of the steady grid current component, thereby to produce a steady magnetic field adapted at least partially to compensate the steady magnetic field developed by said primary coil.

4. A saw-tooth wave generator including a transformer having a ferromagnetic core, a discharge tube having an anode, a cathode and a control grid, a primary coil on said core connected in the anode circuit of said tube, a secondary coil on said core connected in the grid circuit of said tube and having a first group of windings and a second group of windings, and an element having a high impedance value for the alternating grid current component connected between said first and second groups of windings to permit passage through said second group only of the steady grid current component thereby to produce a steady magnetic field adapted at least partially to compensate the steady magnetic field developed by said primary coil, and means connected in parallel relation to the series combination of said element and said second group of windings for by-passing the alternating grid current component.

5. A saw-tooth wave generator including a transformer having a ferromagnetic core, a discharge tube having an anode, a cathode and a control grid, a primary coil on said core connected in the anode circuit of said tube, a secondary coil on said core connected in the grid circuit of said tube and having a first group of windings and a second group of windings, a rectifier means connected between said first group of windings and said second group to permit passage through said second group only of the steady grid current component, thereby to produce a steady magnetic field adapted at least partially to compensate the steady magnetic field developed by said primary coil.

6. Saw tooth current generator including a transformer with ferromagnetic core, a discharge tube having an anode, a cathode and a grid, a primary coil on said core connected to said anode, a secondary coil on said core, a diode arranged in parallel to said secondary winding, deflecting coils lying in parallel to said secondary winding, an additional winding on said ferromagnetic core connected to the cathode of the discharge tube and a high alternating current resistance connected to the deflecting coils and said additional winding.

HERBERT BÄHRING.